United States Patent
Ishiguro et al.

(10) Patent No.: US 10,428,937 B2
(45) Date of Patent: Oct. 1, 2019

(54) CRUISE CONTROL DEVICE AND CRUISE CONTROL METHOD

(71) Applicant: ISUZU MOTORS LIMITED, Tokyo (JP)

(72) Inventors: Shinichi Ishiguro, Kawasaki (JP);
Nobuyuki Nishimura, Yokohama (JP);
Masao Nishikimi, Machida (JP)

(73) Assignee: Isuzu Motors Limited, Tokyo (JP)

( * ) Notice: Subject to any disclaimer, the term of this patent is extended or adjusted under 35 U.S.C. 154(b) by 54 days.

(21) Appl. No.: 15/561,234

(22) PCT Filed: Mar. 18, 2016

(86) PCT No.: PCT/JP2016/058630
§ 371 (c)(1),
(2) Date: Sep. 25, 2017

(87) PCT Pub. No.: WO2016/152751
PCT Pub. Date: Sep. 29, 2016

(65) Prior Publication Data
US 2018/0051802 A1 Feb. 22, 2018

(30) Foreign Application Priority Data
Mar. 26, 2015 (JP) .................. 2015-064245

(51) Int. Cl.
*F16H 59/66* (2006.01)
*F16H 61/02* (2006.01)
(Continued)

(52) U.S. Cl.
CPC ......... *F16H 61/0213* (2013.01); *F16H 59/18* (2013.01); *F16H 59/66* (2013.01);
(Continued)

(58) Field of Classification Search
CPC .......... F16H 61/16; F16H 59/18; F16H 59/66; F16H 2059/666; F16H 2059/142;
(Continued)

(56) References Cited

U.S. PATENT DOCUMENTS 5,832,400 A  11/1998 Takahashi et al.
6,278,928 B1 * 8/2001 Aruga ................ F16H 59/66
                                                477/97
(Continued)

FOREIGN PATENT DOCUMENTS

DE  102010041325 A1  3/2012
JP      08-072591 A   3/1996
(Continued)

OTHER PUBLICATIONS

International Search Report from International Application No. PCT/JP2016/058630 dated Jun. 21, 2016.
(Continued)

*Primary Examiner* — Roger L Pang
(74) *Attorney, Agent, or Firm* — Brundidge & Stanger, P.C.

(57) ABSTRACT

A road information acquisition unit (12a) acquires information about the road in a prescribed segment in front, a vehicle information acquisition unit (12b) acquires information about the vehicle (1), a velocity prediction unit (12c) predicts, on the basis of the road information and the information about the vehicle (1), the changes in the vehicle velocity that would be brought about in the prescribed segment in the case of travelling the prescribed segment in a first gear, and a shift control unit (12d) which maintains the first gear if the condition is satisfied that the predicted vehicle velocity exhibits a minimum value other than at the ends of the prescribed segment and the minimum value is greater than the delay speed, which is set to a value less than a prede-
(Continued)

termined velocity set as the velocity that would result from downshifting.

4 Claims, 5 Drawing Sheets

(51) Int. Cl.
  *F16H 59/18* (2006.01)
  *F16H 61/16* (2006.01)
  *B60W 30/14* (2006.01)
  *F16H 59/44* (2006.01)
  *F16H 59/14* (2006.01)
(52) U.S. Cl.
  CPC ........... *F16H 61/16* (2013.01); *B60W 30/143* (2013.01); *B60Y 2300/143* (2013.01); *F16H 59/44* (2013.01); *F16H 2059/142* (2013.01); *F16H 2059/663* (2013.01); *F16H 2059/666* (2013.01); *F16H 2061/022* (2013.01); *F16H 2061/163* (2013.01)
(58) Field of Classification Search
  CPC ............... F16H 2061/163; F16H 59/44; F16H 2061/022; F16H 2059/663; B60W 30/143; B60Y 2300/143
  USPC .......................................................... 701/57
  See application file for complete search history.

(56) References Cited

U.S. PATENT DOCUMENTS

| 9,297,455 B2* | 3/2016 | Li ..................... F16H 61/00 |
| 2002/0049116 A1 | 4/2002 | Shiiba et al. |
| 2011/0307152 A1* | 12/2011 | Shono ................... B60W 10/06 701/54 |
| 2012/0271524 A1 | 10/2012 | Eriksson et al. |
| 2013/0035837 A1* | 2/2013 | Johansson ............ B60W 10/06 701/98 |
| 2013/0211681 A1 | 8/2013 | Maier et al. |
| 2014/0200788 A1 | 7/2014 | Eriksson et al. |
| 2018/0058574 A1* | 3/2018 | Ishiguro ................. F16H 59/18 |
| 2018/0118207 A1* | 5/2018 | Ishiguro ................. B60K 31/00 |

FOREIGN PATENT DOCUMENTS

| JP | 2002-122225 A | 4/2002 |
| JP | 2013-514927 A | 5/2013 |
| JP | 2014-001824 A | 1/2014 |
| JP | 2015-051646 A | 3/2015 |
| WO | 2013/034161 A1 | 3/2013 |

OTHER PUBLICATIONS

Extended European Search Report dated Jan. 25, 2018 for European Patent Application No. 16768654.2.

* cited by examiner

CRUISE CONTROL DEVICE AND CRUISE CONTROL METHOD

TECHNICAL FIELD

The present invention relates to a travel control device and a travel control method for controlling a transmission to perform a downshift from a first transmission gear to a second transmission gear.

BACKGROUND ART

Conventionally, automatic transmissions for automatically switching a transmission gear in accordance with the speed of a vehicle (vehicle speed), the accelerator operation by the driver, and the like are used in vehicles such as automobiles. PTL 1 discloses a transmission control device of such an automatic transmission, for example.

The transmission control device detects a crest on the course of the vehicle, and determines whether the vehicle can arrive at the crest at a predetermined vehicle speed or greater without a downshift when the distance between from the vehicle and the crest is within a predetermined range. When determining that the vehicle can arrive at the crest at a predetermined vehicle speed or greater without a downshift, the transmission control device restricts a downshift.

With this configuration, frequent transmissions are limited and inconvenience of the driver is reduced while enhancing the fuel economy.

CITATION LIST

Patent Literature

PTL 1

Japanese Patent Application Laid-Open No. 2014-1824

SUMMARY OF INVENTION

Technical Problem

In some situation, however, the configuration disclosed in PTL 1 cannot reduce frequent transmissions.

An example case is a case where there are an upslope, a short downslope, and another upslope in this order. In this case, when the arrival of the vehicle at the crest of the last upslope is not taken into consideration, a downshift can possibly be required in the course of the last upslope even when the vehicle has arrived at the crest of the first upslope without a downshift at the first upslope. In this case, the number of transmissions of the entirety of that section is not reduced.

To solve the above-mentioned problems, an object of the present invention is to provide a travel control device and a travel control method which can shorten the time period until the vehicle reaches the crest while effectively reducing the number of transmissions to enhance the fuel economy in the case where the vehicle travels in a predetermined section.

Solution to Problem

To solve the above-mentioned problems, a travel control device according to an embodiment of the present invention controls a transmission to perform a downshift from a first transmission gear to a second transmission gear, the travel control device including: a road information acquiring section that acquires information about a road in a predetermined section ahead of a vehicle travelling with the first transmission gear; a vehicle information acquiring section that acquires information about the vehicle; a speed estimating section that estimates based on the information about the road and the information about the vehicle a transition of a vehicle speed in the predetermined section in a case where the vehicle travels in the predetermined section with the first transmission gear; and a transmission control section that controls the transmission to maintain the first transmission gear without performing a downshift from the first transmission gear to the second transmission gear when a condition where the vehicle speed estimated by the speed estimating section has a minimum value at a position other than an end of the predetermined section, and the minimum value is larger than a grace speed set at a value smaller than a speed set in advance as a speed at which the downshift is performed is satisfied.

A travel control method according to an embodiment of the present invention is a method for controlling a transmission to perform a downshift from a first transmission gear to a second transmission gear, the method including: acquiring information about a road in a predetermined section ahead of a vehicle travelling with the first transmission gear; acquiring information about the vehicle; estimating based on the information about the road and the information about the vehicle a transition of a vehicle speed in the predetermined section in a case where the vehicle travels in the predetermined section with the first transmission gear; and controlling the transmission to maintain the first transmission gear without performing a downshift from the first transmission gear to the second transmission gear when a condition where the vehicle speed estimated in the estimating has a minimum value at a position other than an end of the predetermined section, and the minimum value is larger than a grace speed set at a value smaller than a speed set in advance as a speed at which the downshift is performed is satisfied.

Advantageous Effects of Invention

With the present invention, when the vehicle travels in a predetermined section, the time period until the vehicle reaches the crest can be shortened while effectively reducing the number of transmissions to enhance the fuel economy.

DESCRIPTION OF EMBODIMENTS

Figure 1:
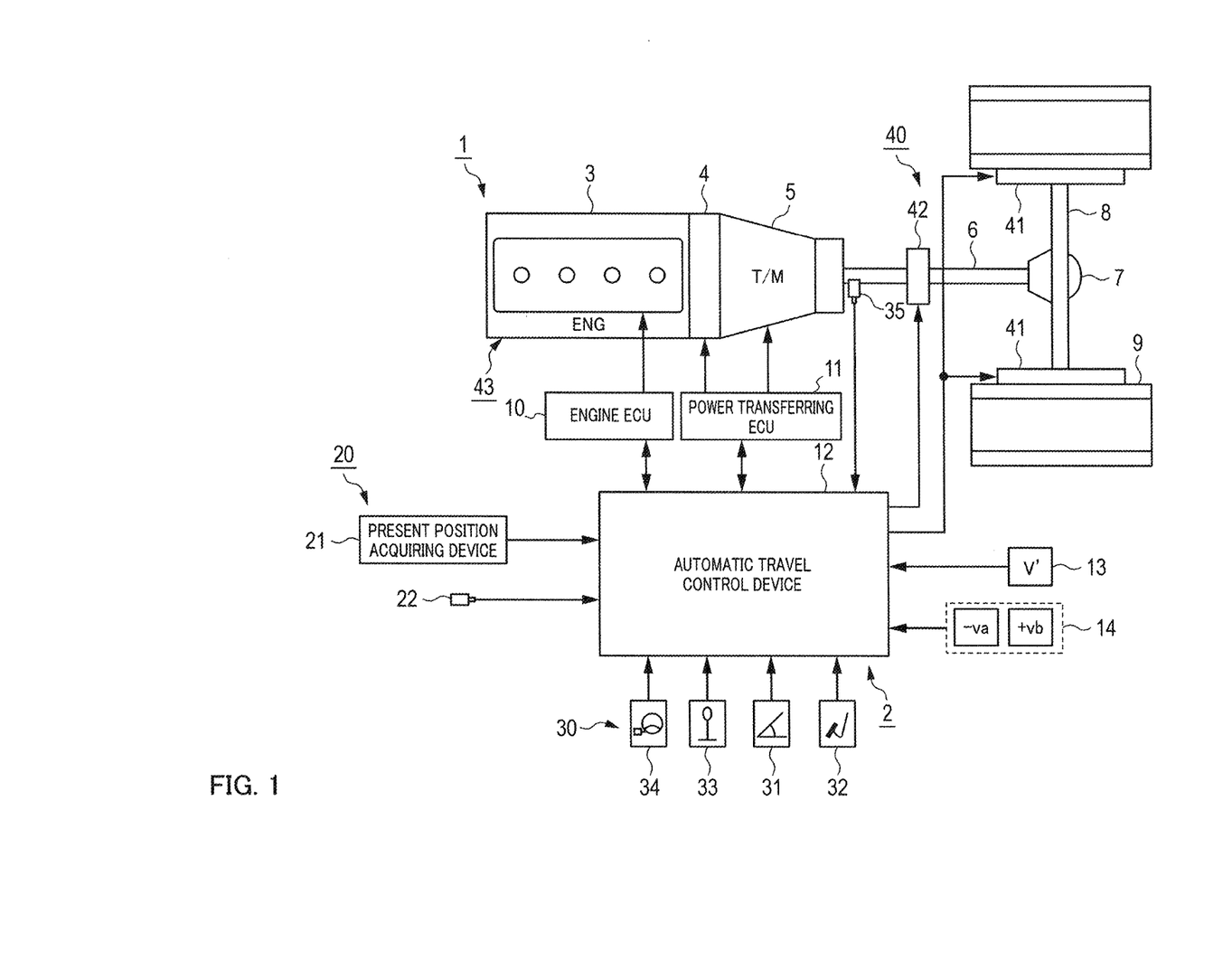
FIG. 1 is a block diagram illustrating an example configuration of an automatic travel device according to an embodiment of the present invention.
Figure 2:
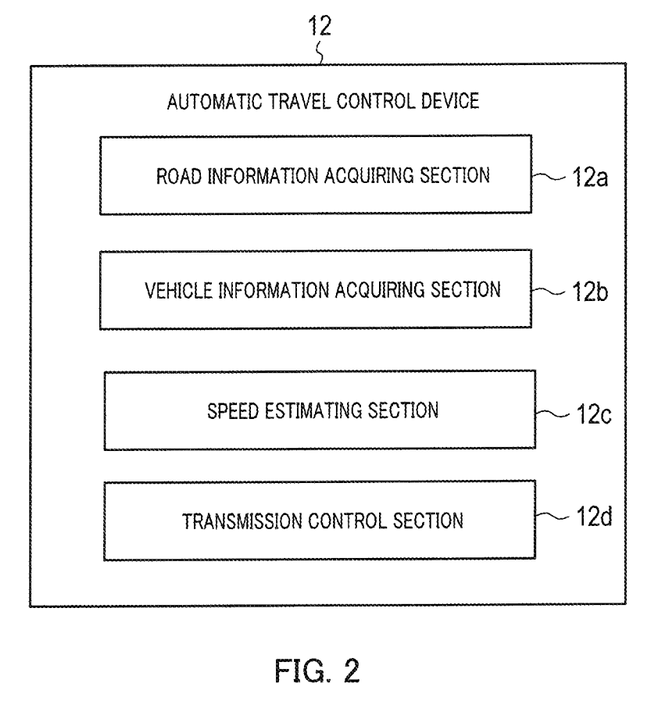
FIG. 2 is a block diagram illustrating an example configuration of an automatic travel control device illustrated in FIG. 1.

An embodiment of the present invention is described below with reference to the accompanying drawings. FIG. 1 is a block diagram illustrating an example configuration of automatic travel device 2 according to the embodiment of the present invention. In addition, FIG. 2 is a block diagram illustrating an example configuration of automatic travel control device 12 illustrated in FIG. 1.

It is to be noted that, while engine 3 is an in-line six-cylinder diesel engine in FIG. 1, the present invention is applicable also to a gasoline engine, and the arrangement and the number of the cylinders are not limited. In addition, while vehicle 1 is a large vehicle such as a truck in which a diesel engine is mounted in the following description, the present invention is not limited to large vehicles such as trucks.

As illustrated in FIG. 1, in vehicle 1 in which automatic travel device 2 of the present embodiment is mounted, the power of engine 3 is transmitted to transmission 5 via clutch 4, and transmitted from transmission 5 to differential gear 7 through a propeller shaft 6, and further, transmitted from differential gear 7 to wheel 9 through drive shaft 8. In this manner, the power of engine 3 is transmitted to wheel 9, and thus vehicle 1 travels.

Automatic travel device 2 of the present embodiment controls the output of engine 3, the connection and disconnection of clutch 4, and the transmission of transmission 5 for automatic travel of vehicle 1. Automatic travel device 2 includes a plurality of control devices.

To be more specific, automatic travel device 2 includes control engine ECU (engine control unit) 10 that controls the output of engine 3, power transferring ECU (power transferring control unit) 11 that controls the connection and disconnection of clutch 4 and the transmission of transmission 5, and automatic travel control device 12 that controls the automatic travel of vehicle 1.

Each of engine ECU 10, power transferring ECU 11, and automatic travel control device 12 is composed of a micro controller. Engine ECU 10, power transferring ECU 11, and automatic travel control device 12 are connected with one another with an in-vehicle network, and required data and control signals are exchanged therebetween.

In addition, automatic travel device 2 includes, at a dashboard of a driver's seat not illustrated, target-vehicle speed setting device 13 and increment/reduction value setting device 14, and target-vehicle speed setting device 13 and increment/reduction value setting device 14 are connected with automatic travel control device 12.

Target-vehicle speed setting device 13 is a device that is manually operated by the driver before the automatic travel of vehicle 1 is started, to set target-vehicle speed V' [km/h] of vehicle 1 in the automatic travel. When target-vehicle speed V' is set in target-vehicle speed setting device 13 by the driver, the target-vehicle speed V' is transmitted to automatic travel control device 12, and stored in a storage device of automatic travel control device 12.

Increment/reduction value setting device 14 is a device that is operated by the driver before the automatic travel of vehicle 1 is started and after target-vehicle speed V' is set, to set both speed reduction value −va [km/h] and speed increment value +vb [km/h] of vehicle 1 in the automatic travel.

When both speed reduction value −va and speed increment value +vb are set in increment/reduction value setting device 14 by the driver, speed reduction value −va and speed increment value +vb are transmitted to automatic travel control device 12, and stored in a storage device of automatic travel control device 12.

In addition, automatic travel control device 12 adds speed reduction value −va and speed increment value +vb to target-vehicle speed V' to calculate lower limit target-vehicle speed Va' [km/h] and upper limit target-vehicle speed Vb' [km/h], and stores the calculated values in the storage device of automatic travel control device 12.

For example, in the case where target-vehicle speed V' is 80 km/h, speed reduction value −va is −5 km/h, and speed increment value +vb is +10 km/h, lower limit target-vehicle speed Va' is 75 km/h and upper limit target-vehicle speed Vb' is 90 km/h. It is to be noted that speed reduction value −va and speed increment value +vb may be set to zero.

Lower limit target-vehicle speed Va' and upper limit target-vehicle speed Vb' define a range of vehicle speed V [km/h] which can be accepted by the driver in the automatic travel of vehicle 1.

In addition, road information acquiring device 20 is a device for acquiring road information about the road ahead. The road ahead is the road extending from the present position of the vehicle in the travelling direction of the vehicle.

For example, road information acquiring device 20 includes present position acquiring device 21 that is a receiver of a global positioning system (GPS), and periphery sensor 22 that detects the distance from vehicles around the travelling vehicle such as a vehicle travelling ahead and/or a vehicle travelling on a side, and the difference in vehicle speed from other vehicles around the travelling vehicle.

Vehicle information acquiring device 30 is a device for acquiring vehicle information of vehicle 1. For example, vehicle information acquiring device 30 includes accelerator sensor 31 that detects the pressing amount of the accelerator pedal, brake switch 32 that detects the presence/absence of the pressing of the brake pedal, shift lever 33, turn-signal switch 34, and vehicle speed sensor 35 that detects vehicle speed V of vehicle 1. In addition, engine ECU 10 and power transferring ECU 11 are also included in vehicle information acquiring device 30.

Braking device 40 is a device for applying a braking force to vehicle 1. Braking device 40 includes foot brake 41, retarder 42, and auxiliary brake 43 such as an exhaust brake that is controlled with engine ECU 10 and/or power transferring ECU 11.

As illustrated in FIG. 2, automatic travel control device 12 includes road information acquiring section 12a, vehicle information acquiring section 12b, speed estimating section 12c, and transmission control section 12d.

Road information acquiring section 12a acquires road information in a predetermined section ahead of the present point of vehicle 1.

To be more specific, road information acquiring section 12a determines the road ahead based on the present position acquired by present position acquiring device 21, map data stored in advance and the like, and acquires information about the road grade in a predetermined section of the acquired road ahead, the curve in the predetermined section of the road ahead, the presence/absence of traffic lights and the like. In addition, road information acquiring section 12a acquires information about the distance and the difference in vehicle speed from other travelling vehicles around the vehicle and the like, which is detected by periphery sensor 22.

It is to be noted that road information acquiring section 12a may determine the predetermined section in accordance with the speed of vehicle 1. For example, road information acquiring section 12a may calculate a distance based on the product of the present vehicle speed and a predetermined time, and may set, as the predetermined section, a section corresponding to the distance from the present point of vehicle 1 in the road ahead.

Vehicle information acquiring section 12b acquires vehicle information required for automatic travel of vehicle 1.

To be more specific, vehicle information acquiring section 12b acquires information about the pressing amount of the accelerator pedal detected by accelerator sensor 31, the presence/absence of the pressing of the brake pedal detected by brake switch 32, the operation of shift lever 33 and/or turn-signal switch 34, vehicle speed V of vehicle 1 detected by vehicle speed sensor 35, the output of engine 3 used in engine ECU 10 and power transferring ECU 11, the weight of vehicle 1, the transmission gear of transmission 5 and the like.

It is to be noted that the information acquired by road information acquiring section 12a and vehicle information acquiring section 12b is not limited to the above-mentioned information, and other information required for automatic travel of vehicle 1 may be acquired. In addition, the devices provided in road information acquiring device 20 and/or vehicle information acquiring device 30 may be changed or additionally provided in accordance with the information to be acquired.

On the basis of road information and vehicle information, speed estimating section 12c estimates the transition of the vehicle speed in the predetermined section of the case where vehicle 1 travels in the predetermined section of the road ahead with the present transmission gear and the maximum accelerator opening. The method of estimating the vehicle speed with speed estimating section 12c is described in detail later.

Transmission control section 12d controls the transmission operation performed by transmission 5 through power transferring ECU 11.

To be more specific, transmission control section 12d stores a shift map in which the relationship among the vehicle speed, the pressing amount of the accelerator pedal, and the transmission gear is defined. Transmission control section 12d refers to the shift map and acquires information about the transmission gear corresponding to the present vehicle speed acquired by vehicle information acquiring section 12b and the pressing amount of the accelerator pedal detected by accelerator sensor 31, to thereby determine whether to change the present transmission gear.

When transmission control section 12d determines that the transmission gear is to be changed, transmission control section 12d sends a request to power transferring ECU 11 to change the transmission gear.

It is to be noted that, in place of transmission control section 12d, power transferring ECU 11 may store the shift map and control the transmission gear based on the shift map.

Further, transmission control section 12d stores information about a grace vehicle speed which is set at a value smaller than a vehicle speed (hereinafter referred to as "downshift vehicle speed") set in advance in the shift map as the vehicle speed at which a downshift is performed.

When a condition where the vehicle speed estimated by speed estimating section 12c has a minimum value at a position other than the end of the predetermined section, and the minimum value is greater than the grace vehicle speed is satisfied, transmission control section 12d controls transmission 5 to maintain the present transmission gear without performing the downshift from the present transmission gear.

Here, the vehicle speed of vehicle 1 travelling in a predetermined section is considered to be minimized at the time when the vehicle passes through the highest point in the predetermined section. The estimated speed having the minimum value at other positions than the end means that, when the vehicle can pass through the above-mentioned highest point at a vehicle speed greater than the grace vehicle speed, the vehicle can travel without changing the present transmission gear even in the case where a plurality of upslope roads are included in the predetermined section.

With the above-mentioned control, when the vehicle travels in a predetermined section, the time period until the vehicle reaches the crest can be shortened while effectively reducing the number of transmissions to enhance the fuel economy.

Next, The method of estimating the vehicle speed with speed estimating section 12c is described. When the present vehicle speed is represented by $V_n$ [km/h], and the estimated vehicle speed at a position ahead by L [m] is represented by $V_{n+1}$ [km/h], the relationship between $V_n$ and $V_{n+1}$ is expressed by the Expression (1).

[Expression 1]

$$V_{n+1} = V_n + \Delta V_n \quad (1)$$

Here, $\Delta V_n$ [km/h] is calculated with the Expression (2).

[Expression 2]

$$\Delta V_n = 3.6^2 \times (G - \theta/100) \times 9.81 \times L / V_n \quad (2)$$

Here, θ[%] is an average road grade from the present position to a position ahead of the present position by L. The average road grade is calculated from the above-described map data.

In addition, G [km/h²] is the acceleration of the case where the vehicle travels with the present transmission gear and the maximum accelerator opening, and is calculated with the Expression (3).

[Expression 3]

$$G = [tq \cdot rt \cdot rf \cdot \eta / tr - \{(M \cdot rrc) + (arc \cdot V_n^2)\}] / M \quad (3)$$

Here, tq [kgf·m] is the maximum torque of engine 3 of the case where the vehicle travels with the present transmission gear at vehicle speed Vn, rf the gear ratio of the present transmission gear, rf the gear ratio of the final gear, η the transmission efficiency, tr [m] the tire radius, M [kg] the vehicle weight, rrc the roll resistance coefficient, and arc [kgf/(km/h)²] the air resistance coefficient. These pieces of information are included in the vehicle information that is acquired by vehicle information acquiring section 12b.

By use of Expressions (1) to (3), speed estimating section 12c can estimate vehicle speed $V_n$ of a position ahead of the present position by nL (n=1, 2, . . . ) with the present vehicle speed $V_0$ as the initial value.

Figure 3:
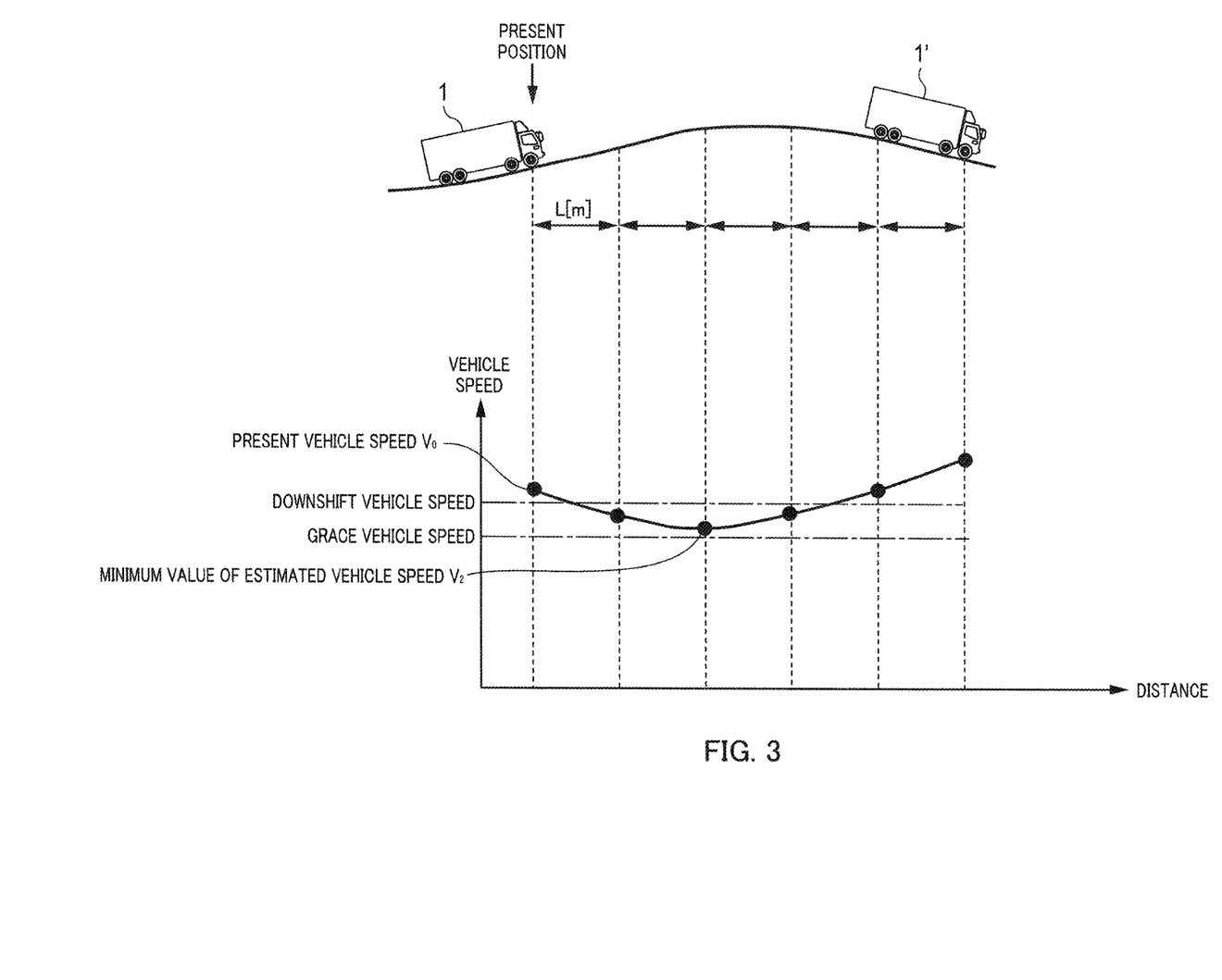
FIG. 3 illustrates an example process of determining the necessity of a downshift according to the embodiment of the present invention.
Figure 4:
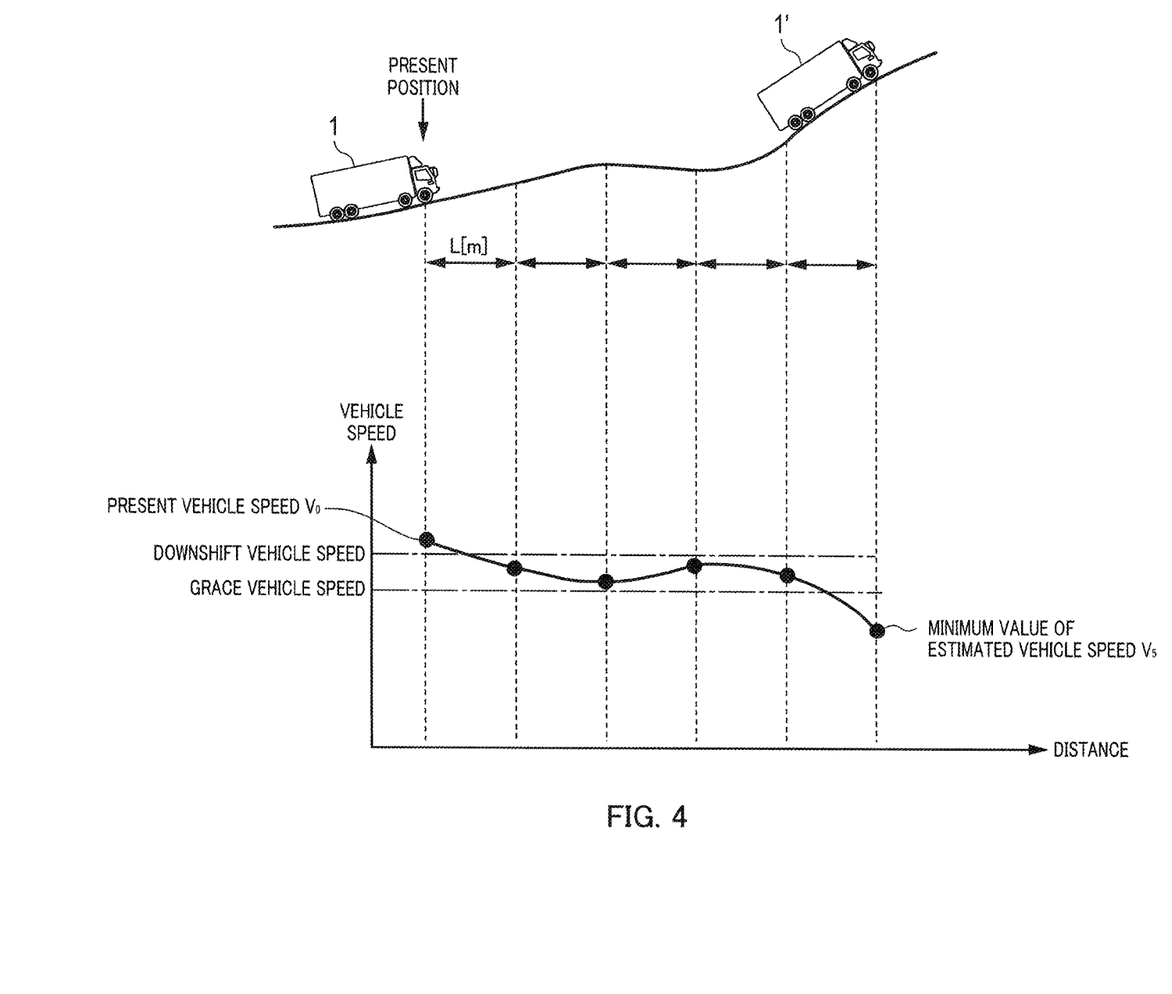
FIG. 4 illustrates an example process of determining the necessity of a downshift according to the embodiment of the present invention.

Next, an example process of determining the necessity of a downshift according to the embodiment of the present invention is described. FIG. 3 and FIG. 4 illustrate an example process of determining the necessity of a downshift according to the embodiment of the present invention.

FIG. 3 illustrates vehicle 1 travelling on an upslope road, and vehicle 1' travelling on a downslope road ahead of the upslope road by 5 L. FIG. 4 illustrates vehicle 1 travelling on an upslope road, and vehicle 1' having passed through a downslope road and travelling on the next upslope road ahead of the upslope road by 5 L. In addition, the graphs of FIG. 3 and FIG. 4 show a transition of an estimated vehicle speed.

In the case of FIG. 3, vehicle speed $V_2$ at a point other than the end of the predetermined section has the minimum value. Since vehicle speed $V_2$ is greater than the grace vehicle speed, transmission control section 12d controls transmission 5 to maintain the transmission gear.

In the case of FIG. 4, vehicle speed $V_5$ at the end of the predetermined section has the minimum value. Since vehicle speed $V_5$ is smaller than the grace vehicle speed, transmission control section 12d controls transmission 5 to perform a downshift from the present transmission gear without maintaining the present transmission gear.

Figure 5:
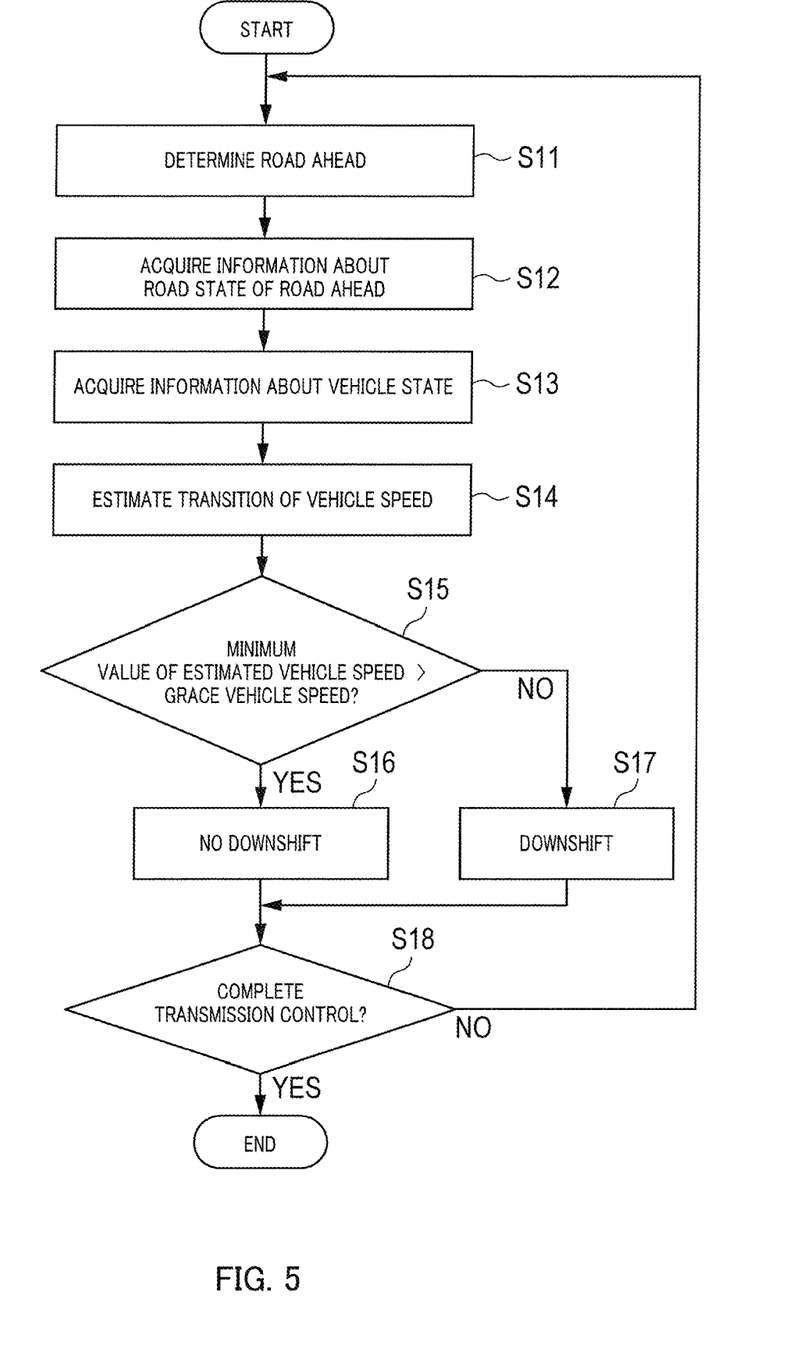
FIG. 5 is a flowchart of an example process of a travel control according to the embodiment of the present invention.

Next, an example process of the travel control according to the embodiment of the present invention is described. FIG. 5 is a flowchart of an example process of the travel control according to the embodiment of the present invention.

First, road information acquiring section 12a determines the road ahead (step S11), and acquires road information about the road ahead (step S12). Then, vehicle information acquiring section 12b acquires information about the vehicle state (step S13).

Subsequently, on the basis of the road information and the vehicle information, speed estimating section 12c estimates the transition of the vehicle speed of vehicle 1 in a predetermined section of the case where vehicle 1 travels with the present transmission gear and the maximum accelerator opening (step S14).

Next, transmission control section 12d determines whether a condition where the vehicle speed estimated by speed estimating section 12c has a minimum value at a position other than the end of the predetermined section, and the minimum value is greater than the grace vehicle speed is satisfied (step S15).

Then, when the minimum value of the vehicle speed in the predetermined section satisfies the above-described condition (YES at step S15), transmission control section 12d controls transmission 5 to maintain the present transmission gear without performing a downshift (step S16).

When the minimum value of the vehicle speed in the predetermined section does not satisfy the above-described condition (NO at step S15), transmission control section 12d controls transmission 5 to perform a downshift (step S17).

After step S16 or step S17, transmission control section 12d determines whether to complete the transmission control (step S18). For example, transmission control section 12d determines that the transmission control is to be completed when the driver has requested to complete the automatic travel, or when the present vehicle speed has reached target-vehicle speed V'.

When transmission control section 12d determines that the transmission control is to be completed (YES at step S18), transmission control section 12d completes the transmission control. When transmission control section 12d determines that the transmission control is not to be completed (NO at step S18), the processes subsequent to step S11 are again performed.

While speed estimating section 12c estimates the transition of the vehicle speed of the case where vehicle 1 travels in a predetermined section of the road ahead with the present transmission gear and the maximum accelerator opening in the embodiment of the present invention described above, the present invention is not limited to this.

For example, speed estimating section 12c may estimate the transition of the vehicle speed of the case where the vehicle travels with an accelerator opening equal to or greater than the current accelerator opening, not the maximum accelerator opening.

Also in such a configuration, when a condition where the vehicle speed estimated by speed estimating section 12c has a minimum value at a position other than the end of the predetermined section, and the minimum value is greater than the grace vehicle speed is satisfied, transmission control section 12d controls transmission 5 to maintain the present transmission gear without performing a downshift from the present transmission gear.

As described above, in automatic travel control device 12 that controls a transmission to perform a downshift from a first transmission gear to a second transmission gear, road information acquiring section 12a acquires information about a road in a predetermined section ahead of vehicle 1 travelling with the first transmission gear; vehicle information acquiring section 12b acquires information about vehicle 1; speed estimating section 12c that estimates transition of a vehicle speed in the predetermined section in a case where vehicle 1 travels in the predetermined section with the first transmission gear based on the information about the road and the information about vehicle 1; and transmission control section 12d controls the transmission to maintain the first transmission gear without performing a downshift from the first transmission gear to the second transmission gear when a condition where vehicle 1 speed estimated by the speed estimating section 12c has a minimum value at a position other than an end of the predetermined section, and the minimum value is larger than a grace speed set at a value smaller than a speed set in advance as a speed at which the downshift is performed is satisfied. With this configuration, in the case where vehicle 1 travels in a predetermined section, the time period until the vehicle reaches the crest can be shortened while effectively reducing the number of transmissions to enhance the fuel economy.

In addition, in the present embodiment, the transition of the vehicle speed estimated by speed estimating section 12c is the transition of the vehicle speed of the case where the vehicle travels in a predetermined section with the maximum accelerator opening. With this configuration, the number of transmissions can be further effectively reduced, and the time period until the vehicle reaches the crest can be further shortened.

In addition, in the present embodiment, road information acquiring section 12a determines the predetermined section in accordance with the present speed of vehicle 1. With this configuration, the predetermined section for the vehicle speed estimation can be further appropriately changed.

In addition, in the present embodiment, when the speed of vehicle 1 reaches target speed V' that is set in advance, transmission control section 12d releases the control of maintaining the first transmission gear of transmission 5. With this configuration, it is possible to smoothly resume the automatic travel control for controlling the vehicle speed of vehicle 1 at the target speed.

This application is entitled to and claims the benefit of Japanese Patent Application No. 2015-064245 dated Mar. 26, 2015, the disclosure of which including the specification, drawings and abstract is incorporated herein by reference in its entirety.

INDUSTRIAL APPLICABILITY

The present invention can be applied to a travel control device and a travel control method for controlling a transmission to perform a downshift from a first transmission gear to a second transmission gear.

REFERENCE SIGNS LIST

1 Vehicle
2 Automatic travel device

3 Engine
4 Clutch
5 Transmission
10 Engine ECU (engine control unit)
11 Power transferring ECU (power transferring control unit)
12 Automatic travel control device
12a Road information acquiring section
12b Vehicle information acquiring section
12c Speed estimating section
12d Transmission control section
13 Target-vehicle speed setting device
14 Increment/reduction value setting device
20 Road information acquiring device
30 Vehicle information acquiring device
40 Braking device

The invention claimed is:

1. A travel control device that controls a transmission to perform a downshift from a first transmission gear to a second transmission gear, the travel control device comprising:
　a road information acquiring section that acquires information about a road in a predetermined section ahead of a vehicle travelling with the first transmission gear;
　a vehicle information acquiring section that acquires information about the vehicle;
　a speed estimating section that estimates, based on the information about the road and the information about the vehicle, a transition of a vehicle speed in the predetermined section in a case where the vehicle travels in the predetermined section with the first transmission gear; and
　a transmission control section that controls the transmission to maintain the first transmission gear without performing a downshift from the first transmission gear to the second transmission gear when a condition where the transition of the vehicle speed estimated by the speed estimating section has a minimum value at a position other than an end of the predetermined section, and the minimum value is larger than a grace speed set at a value smaller than a speed set in advance as a speed at which the downshift is performed is satisfied,
　wherein the transition of the vehicle speed estimated by the speed estimating section is a transition of the vehicle speed when the vehicle travels in the predetermined section with a maximum accelerator opening.

2. The travel control device according to claim 1, wherein the road information acquiring section determines the predetermined section in accordance with a present speed of the vehicle.

3. The travel control device according to claim 1, wherein the transmission control section releases the control of the transmission to maintain the first transmission gear when a speed of the vehicle reaches a target speed set in advance.

4. A travel control method for controlling a transmission to perform a downshift from a first transmission gear to a second transmission gear, the method comprising:
　acquiring information about a road in a predetermined section ahead of a vehicle travelling with the first transmission gear;
　acquiring information about the vehicle;
　estimating, based on the information about the road and the information about the vehicle, a transition of a vehicle speed in the predetermined section when the vehicle travels in the predetermined section with the first transmission gear, the transition of the vehicle speed being a transition of the vehicle speed when the vehicle travels in the predetermined section with a maximum accelerator opening; and
　controlling the transmission to maintain the first transmission gear without performing a downshift from the first transmission gear to the second transmission gear when a condition where the transition of the vehicle speed estimated in the estimating has a minimum value at a position other than an end of the predetermined section, and the minimum value is larger than a grace speed set at a value smaller than a speed set in advance as a speed at which the downshift is performed is satisfied.

* * * * *